United States Patent [19]

Shindo

[11] Patent Number: 4,829,332
[45] Date of Patent: May 9, 1989

[54] FOCUS DETECTING OPTICAL SYSTEM

[75] Inventor: Osamu Shindo, Tokyo, Japan

[73] Assignee: Asahi Kogaku Kabushiki Kaisha, Tokyo, Japan

[21] Appl. No.: 171,318

[22] Filed: Mar. 21, 1988

[30] Foreign Application Priority Data

Mar. 26, 1987 [JP] Japan .................................. 62-72784

[51] Int. Cl.$^4$ ................................................ G03B 3/00
[52] U.S. Cl. .................................... 354/407; 250/201; 250/204
[58] Field of Search ................ 354/402, 406, 407, 408; 250/201 PF, 201, 204

[56] References Cited

U.S. PATENT DOCUMENTS

| 4,370,551 | 1/1983 | Fukuhara et al. | 250/204 X |
| 4,552,445 | 11/1985 | Mukai | 354/406 |
| 4,716,431 | 12/1987 | Shindo | 354/407 |

Primary Examiner—W. B. Perkey
Attorney, Agent, or Firm—Sughrue, Mion, Zinn, Macpeak & Seas

[57] ABSTRACT

An optical system for use in a focus detecting apparatus has a photographing lens for forming an image of an object, a condenser lens disposed behind, with respect to the photographic lens, a plane corresponding to a photographing film surface, and a pair of split optical elements located behind the condenser lens for splitting the image of the object. The split optical elements are symmetrical with respect to a meridional plane of the condenser lenses. Using a line sensor, a relative positional shift of the images is detected by the optical system to determine a focal position. The optical system has a sufficiently large spherical aberration that the diameter of the minimum circle of confusion at the maximum contrast position is larger than the width of one bit of the line sensor.

4 Claims, 1 Drawing Sheet (a)   (b)   (c)

FOCUS DETECTING OPTICAL SYSTEM

BACKGROUND OF THE INVENTION

This invention relates to an optical system for use in a focus detecting system in a camera or the like.

In an optical system for use in a focus detecting apparatus, a relative positional shift of images of an object is detected and a focal position is determined based on the positional shift. In U.S. Pat. No. 4,716,431, commonly owned with the subject application, an optical system of this type is disclosed. An image of an object is transmitted through the optical system, which is disposed behind a film equivalent surface, and the so transmitted image is split by split optical elements into two substantially similar images. The split optical elements are disposed symmetrically with respect to the meridional plane of a condenser lens used in the optical system. The focus position is detected by determining the relative positional mismatch between the two images. In this system, a condenser lens is disposed at or in the vicinity of a film equivalent surface. A rear surface of the condenser lens is an ellipsoidal surface satisfying a particular relationship, and an auxiliary lens is disposed just in front of the split optical elements.

An invention of this type has also been disclosed by Japanese Unexamined Published Patent Application No. 41013/1985.

In U.S. patent application Ser. No. 122,713, filed Nov. 18, 1987, also commonly owned with the subject application, another optical system for use in a focus detecting apparatus is described, which system is similar to the system described in U.S. Pat. No. 4,716,431, but is specifically designed to eliminate any transverse comatic aberration of such an optical system and cancel any "tendency" of the comatic aberration of an imaging lens.

The description of the above-mentioned U.S. patent, U.S. patent application, and Japanese Application are not admissions of prior art.

In such systems, it has been discovered that, (1) if a line sensor light receiving surface, for receiving the images at a particular plane, is placed at the maximum contrast position, then the size of a point image (which would appear as a circle called the "circle of confusion") is decreased to the extent that it is included within one bit (photosensitive element such as a photodetector) of the sensor, which makes it difficult to continuously and smoothly obtain relative positional distances between the point images, thus adversely affecting the distance measurement, and (2) if the line sensor is placed behind the maximum contrast position, a comatic aberration occurs, as a result of which the point image becomes asymmetric. This latter phenomenon will also adversely affect the distance measurement. Due to the above-described two phenomena, it has been proposed that the line sensor light receiving surface be placed in front of the maximum contrast position.

However, when the line sensor is placed in front of the maximum contrast position, the image energy density is reduced. Moreover, the coefficient for estimating the amount of defocus on the film surface from the image spacing is increased, and therefore calculation of the image spacing must be performed with high accuracy. This latter phenomenon will be described with reference to FIG. 1.

First, consider the case where the line sensor light receiving surface is at the maximum contrast position 8.

In FIG. 1, $l_0$ is the image spacing provided when the focus plane of a photographing lens 10 coincides with a plane 2 equivalent to the film surface, 3 represents a condenser lens, 4 represents an auxiliary lens, 5 represents a mask, 6 represents a split optical element, and 1 represents the image spacing provided when the focus plane is located beyind the plane 2 by an amount of defocus (D). In this case, the amount of defocus D is obtained from the following approximate expression in which $(l - l_0)$ represents the image spacing difference:

$$D \neq K(l - l_0)$$

where K is the coefficient for predicting an amount of defocus, and this coefficient will be referred to as a "K value", when applicable.

With reference to FIG. 1, when the line sensor light receiving surface is in position 8' located in front of the maximum contrast position, the image spacing difference $(l' - l_0')$ is smaller than the image spacing difference which is provided when the line sensor is located at the maximum contrast position 8.

When the line sensor is located in front of the maximum contrast position 8, but the same amount of defocus as given by the above-described expression is desired or required, then the K value should be increased. That is, to obtain the amount of defocus with the same accuracy as when the line sensor is at the maximum contrast position, the image spacing difference $(l' - l_0')$ must be obtained with higher accuracy when the line sensor is in front of the maximum contrast position.

SUMMARY OF THE INVENTION

An object of this invention is to eliminate the above-described difficulties. More specifically, an object of the invention is to provide a focus detecting optical system has an aberration which is made sufficiently large such that the diameter of the minimum circle of confusion at the maximum contrast position is larger than the width of one bit of the line sensor.

These and other objects are achieved in the inventive focus detecting optical system which includes a photographing lens for forming an image of an object, a condenser lens disposed behind, with respect to the photographing lens, a plane corresponding to a photographing film surface, and a pair of split optical elements located behind the condenser lens such that the optical elements are symmetrical with respect to a meridional plane of the condenser lens. The split optical elements form images of the object. A relative positional shift of the images is detected by the optical system to determine a focal position. The focus detecting optical system has a sufficiently large aberration such that the diameter of the minimum circle of confusion at the maximum contrast position is larger than the width of one bit of a line sensor.

BRIEF DESCRIPTION OF THE DRAWINGS

The above objects, features and advantages of the invention as well as further object, features and advantages will become more evident upon reading the detailed description of the invention with reference to the drawings, in which.

DETAILED DESCRIPTION OF THE PREFERRED EMBODIMENTS

Figure 1:
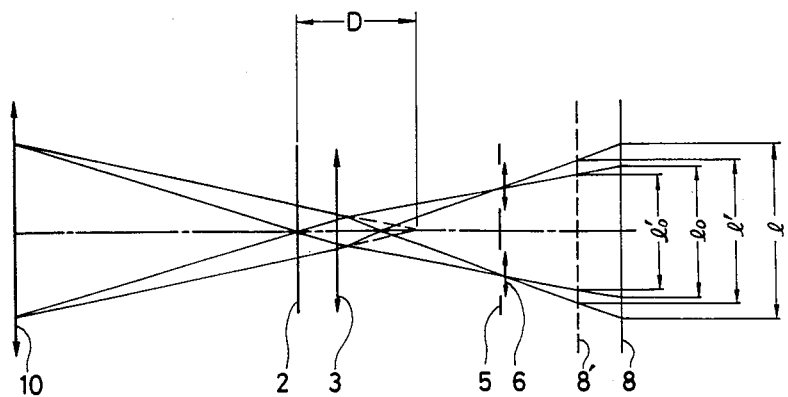
FIG. 1 is a diagram for a description of a conventional focus detecting optical system.
Figure 2:
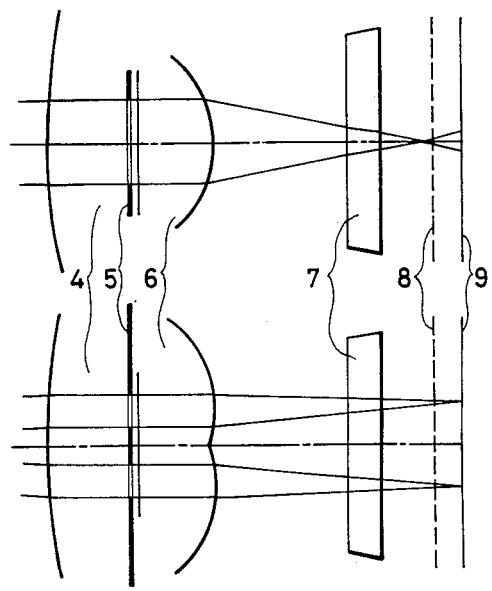
FIG. 2 is an explanatory diagram showing one embodiment of this invention.

One embodiment of this invention which achieves the above-described objects is shown in FIG. 2.

FIG. 2 is an explanatory diagram in which there is an auxiliary lens 4, a mask 5, a pair of split optical elements 6 and a line sensor having cover glass 7. The line sensor has a light receiving face on which there is an array of photosensitive elements (bits) such as photodetectors. Dashed line 8 represents a maximum contrast position and solid line 9 represents a gaussian image plane.

Figure 3:
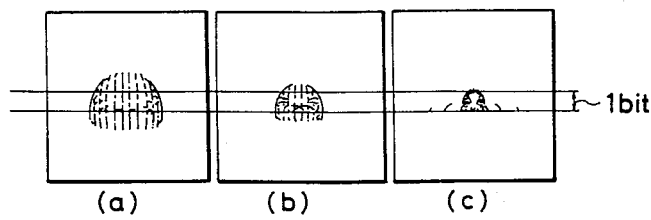
FIG. 3 is a diagram showing the size of various point image distributions depending upon the positioning of a line sensor in FIG. 2.

In FIG. 2, a light beam from a condenser lens (not shown) is allowed to pass through the auxiliary lens 4 and mask 5. After passing through the mask 5, the light beam is then applied to the light receiving surface of the line sensor using the pair of split optical elements 6. The light receiving surface of the line sensor is disposed at the maximum contrast position 8. In this case, the point image distribution is larger than the width of one bit of the sensor as shown in part (b) of FIG. 3. That is, the difficulty described in paragraph (1) of the Background section is eliminated. When the line sensor receiving surface is disposed slightly before the maximum contrast position 8, the point image distribution is as shown in part (a) of FIG. 3. That is, the image energy density is lowered. When the line sensor is placed slightly behind the maximum contrast position 8, the point image distribution is as shown in part (c) of FIG. 3. That is, comatic flares are formed, thus lowering the image energy density.

As was described above, in the focus detecting optical system of the invention, the aberration is made so large that the diameter of the minimum circle of confusion (the smallest point image formed at the line sensor) at the maximum contrast position is larger than the width of one bit of the line sensor. With such an optical system, the image energy density is not reduced, and an object low in luminance can be focused with high accuracy.

What is claimed is:

1. An optical system for use in a focus detecting device comprising: a photographing lens for forming an image of an object; a condenser lens disposed behind a plane equivalent to a photographing film surface; and a pair of split optical elements, located behind said condenser lens for forming images of the object, said optical elements being symmetrical with the meridional plane of said condenser lens; a line sensor having a plurality of photosensitive elements for detecting portions of the images of the object which are formed by said split optical elements, wherein said optical system has an aberration such that the diameter of the minimum circle of confusion at the maximum contrast position is larger than the width of one of said photosensitive elements of said line sensor.

2. The apparatus of claim 1, wherein said line sensor has a light receiving surface disposed at the maximum contrast position, and said photosensitive elements are disposed at said photosensitive surface.

3. In an optical system for use in a focus detecting device having means for forming an image of an object, means for splitting the image of an object into two images, and means for detecting a relative positional shift of the two images of the object, said means for detecting including a line sensor having a plurality of photosensitive elements for detecting portions of the images, the improvement wherein the optical system has an aberration such that the diameter of the minimum circle of confusion at the maximum contrast position is larger than the width of one of said photosensitive elements of said line sensor.

4. The apparatus of claim 3, wherein said line sensor has a light receiving surface disposed at the maximum contrast position, and said photosensitive elements are disposed at said photosensitive surface.

* * * * *